Feb. 5, 1952     R. B. SPRINKEL ET AL     2,584,636
DETACHABLE AUXILIARY STEERING WHEEL FOR DUAL CONTROL ASSEMBLIES
Filed Feb. 16, 1950     2 SHEETS—SHEET 1

INVENTOR
ROBERT B. SPRINKEL
HAVEN D. UMSTOTT
HAROLD E. KNIGHT JR.

BY Cushman Darby & Cushman

ATTORNEY

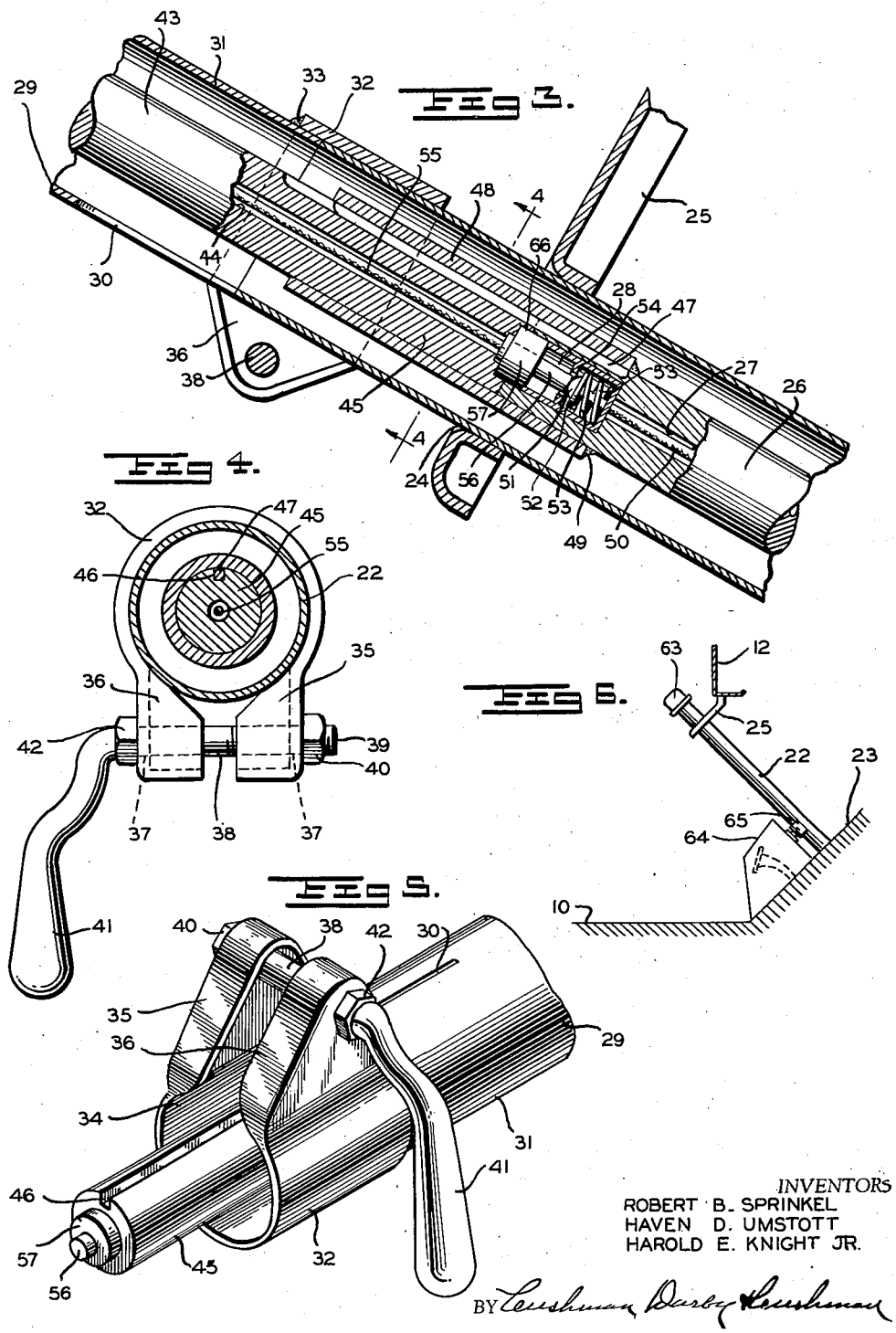

Patented Feb. 5, 1952

2,584,636

UNITED STATES PATENT OFFICE 2,584,636

DETACHABLE AUXILIARY STEERING WHEEL FOR DUAL CONTROL ASSEMBLIES

Robert B. Sprinkel, Takoma Park, Md., Haven D. Umstott, Washington, D. C., and Harold E. Knight, Jr., Arlington, Va.

Application February 16, 1950, Serial No. 144,458

2 Claims. (Cl. 74—494)

The present invention relates to steering columns for motor vehicles and, more particularly, to a new and improved dual control mechanism having a removable auxiliary steering wheel.

An important object consists in associating with the main steering wheel, an auxiliary steering wheel assembly which may be installed as standard equipment or readily connected to a motor vehicle so that the occupants of the front seat may interchangeably take over the driving of the car without the inconvenience of changing places when the driver, for any reason, wishes to relinquish control of the car. The auxiliary steering wheel assembly includes a fixed tubular lower column and a detachable upper tubular column in axial alignment with the lower column. Additionally, means are provided for detachably securing or clamping the upper and lower columns firmly in a fixed or rigid position relative to each other. A lower steering shaft is rotatably mounted in the lower column and is operatively connected to the front wheels of the vehicle. An upper steering shaft is rotatably mounted in the upper steering column, and interlocking means are provided for detachably connecting the steering shafts together when the parts are assembled. The steering shafts are provided with axial through openings in which are positioned rods or wires for establishing an electrical connection through the actuation of a switch on the steering wheel with a signaling device such as a horn or the like. The opposed inner ends of each of the rods are in the form of electrical abutting contacts, and yieldable means are provided for maintaining the contacts in engagement when the shafts are connected by the locking means.

A further object consists in associating with the auxiliary clutch, brake and accelerator pedals of the auxiliary steering wheel assembly, a removable cover which may be maintained in a fixed position over the auxiliary pedals by means detachably connected to the steering wheel column, so that when the auxiliary steering wheel is not in use, the cover is positioned to protect the auxiliary clutch, brake and accelerator pedals and may constitute a footrest for the occupant of the front seat next to the driver.

Other objects and advantages of the invention will become apparent from the following description when taken in conjunction with the accompanying claims and drawings.

Referring to the drawings in which is shown a preferred embodiment of the invention:

Figure 4 is a sectional view taken substantially along the line 4—4 of Figure 3.

Figure 5 is a detail perspective view of the lower end portion of the detachable upper steering column and the upper steering wheel shaft.

Figure 6 is a detail side view showing the cover for protecting the auxiliary clutch, brake and accelerator pedals and the means for detachably connecting the cover to the auxiliary steering wheel post or column, and Figure 7 is a detail perspective view of the cover for the auxiliary pedals.

Figure 1:
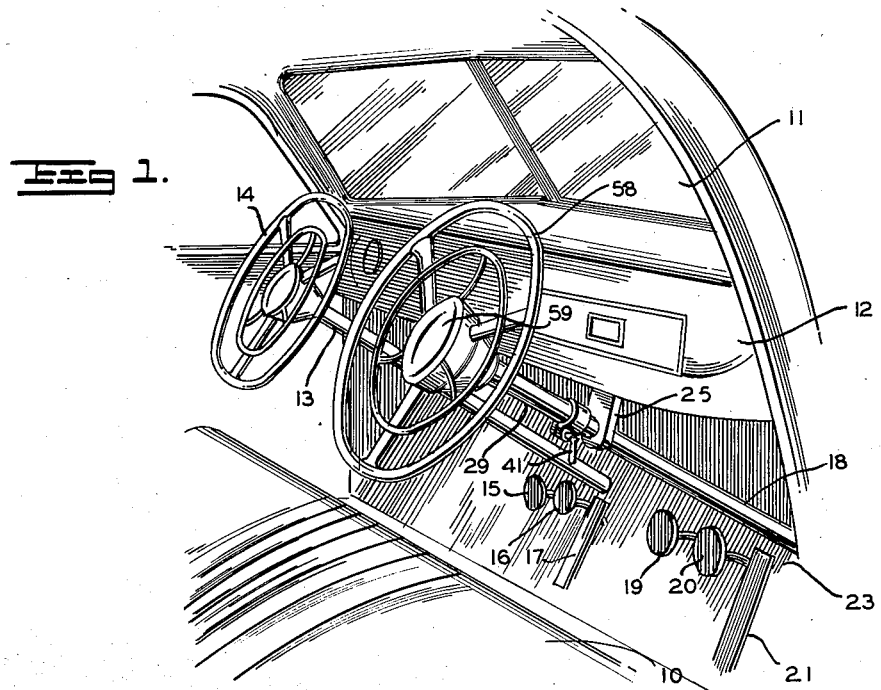
Figure 1 is a perspective view of the front seat of a motor vehicle showing the dual control steering mechanism and detachable auxiliary steering wheel assembly, and constructed in accordance with the present invention.

Referring to the drawings, 10 designates the front seat of a motor vehicle, 11 the windshield, and 12 the dash. The main steering wheel column 13 at its upper end is connected with the steering wheel 14 and, as shown, is positioned on the left-hand side of the car. Associated with the main steering wheel and conveniently positioned relative to the feet of the operator is the usual clutch pedal 15, brake pedal 16 and accelerator pedal 17.

In order that the occupant of the front seat next to the driver can, at any time, take over the control and operation of the automobile, there is provided an auxiliary steering wheel assembly 18 which may be substantially similar in construction and operation to the auxiliary mechanism disclosed in the Sprinkel Patent No. 2,406,261, August 20, 1946. Also, adjacent the feet of the occupant of the car next to the driver is an auxiliary clutch pedal 19, a brake pedal 20 and an accelerator pedal 21 which are operatively connected to the corresponding clutch, brake and accelerator pedals 15, 16 and 17, so that when the vehicle is being operated by either the driver or the auxiliary driver, the control of the operation and steering of the vehicle can, at any time, be taken over by the other driver.

Figure 2:
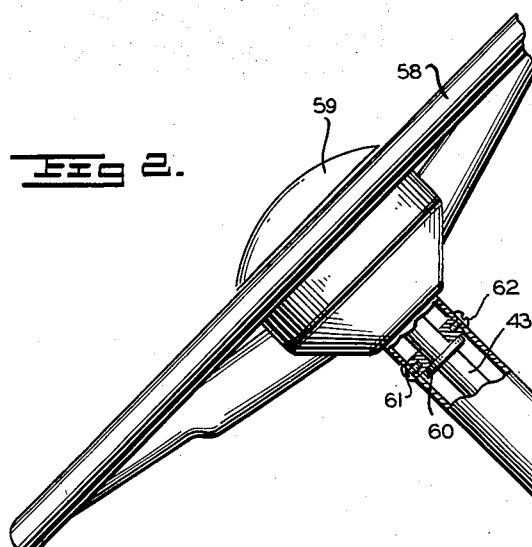
Figure 2 is a detail perspective view with parts in section of the auxiliary steering assembly.
Figure 3:
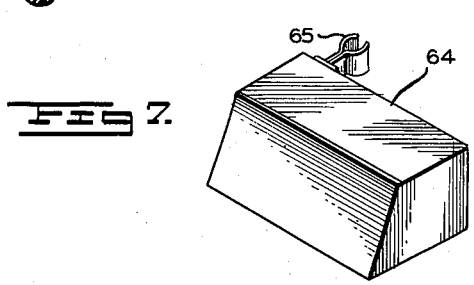
Figure 3 is a longitudinal sectional view of the detachable steering column with parts of the steering shaft in side elevation.

When the dual control steering mechanism is not required to be used and it is desired to provide ample space for the occupant of the front seat adjacent to the driver of an automobile or truck without interference of the auxiliary steering wheel, simple and efficient means are provided for removing the auxiliary steering wheel. This means includes forming the auxiliary steering assembly 18 with a lower fixed tubular column or section 22 (Fig. 3) that extends upwardly from the footboard 23 and has its upper end projecting through an opening 24 in the supporting bracket 25 that may extend downwardly from the underside of the dash 12 and be secured thereto by suitable retaining means 25' (Fig. 2). A lower steering shaft 26 is rotatably mounted in the column 22 and is connected at its lower end to a tie rod or the like that, in turn, may be connected to the front wheels of the vehicle in any well known manner, not shown. The shaft 26 has an axially disposed through opening 27 which communicates with a chamber or recess 28 formed in the outer end thereof for a purpose subsequently to be described. An upper tubular column 29 at its lower end is provided with an elongated slit 30 (Fig. 5) so as to form an expansible and contractible end portion 31. An annular yieldable clamping member or collar 32 is secured in any suitable manner to the outer surface of the end portion 31, such as by welding or the like as at 33. The clamping member 32 has spaced opposed ends 34 provided with laterally and outwardly projecting parallel ears or lugs 35 and 36 that are formed with transversely aligned openings 37 (Fig. 4) through which extends a retaining bolt 38 having a threaded end portion 39 that receives a nut 40 fixed to the outer adjacent lug 35. The bolt 38 at its opposite end is formed with an angularly disposed manually operating handle 41 and a bearing nut 42 rotatable with the bolt and engaging the side of the lug 36. Thus, it will be seen that upon rotation of the handle 41 in the one direction will cause contraction of the clamping member 32 and the end portion 31 of the column 29, while rotation of the handle 41 in an opposite direction will allow these parts to expand. An upper steering shaft 43 (Fig. 3) is rotatably mounted in the upper column 29 and is in substantially axial alignment with the lower shaft 26 so as to be connected thereto when the parts are assembled. The shaft 43 has an axial through opening 44 and a lower end portion 45 which projects beyond the clamping member 32 (Fig. 5) and is formed with a longitudinally disposed groove 46 in one side thereof that is arranged to receive a fixed coacting lug or rib 47 that extends inwardly from an elongated sleeve or collar 48 that may be welded as at 49 or otherwise secured to the outer surface of the upper end of the lower shaft 26, so as to overlap the end portion 45 of the shaft 43 and be locked thereto by engagement of the rib 47 with the groove 46. Manifestly, any other suitable locking means may be provided for detachably securing the upper and lower sections of the shaft together when the separable sections of the steering post are assembled. A rod or wire 50 extends through the axial opening 27 in the lower shaft 26 so as to provide an electrical connection with a signal device, such as a horn or the like not shown. The upper end of the rod 50 projects into the chamber 28 and is formed with an enlarged contact head 51. Surrounding the flexible wire 50 adjacent the head 51 is an insulated ring or collar 52, between which and the wall of the chamber 28 is confined a coil spring 53 that normally urges the contact 51 outwardly of the chamber. An annular shoulder 54 extends inwardly from the wall of the chamber 28 so as to form a stop for the ring 52 in order to limit the outward movement of the contact 51. A rod or wire 55 extends through the axial opening 44 of the shaft 43 and at its lower end 56 (Fig. 5) projects beyond the adjacent end of the end portion 45 of the shaft 43 so as to form a contact head that engages the head 51 when the parts are assembled so as to complete an electrical circuit with the signaling device. The end 56 of the rod may be supported within the chamber 28 by an insulated member or disc 57 that fits in a recess 66 in the lower end of the shaft 43. The recess 66 constitutes an extension of the chamber 28 when the parts are assembled and assists in supporting the member 57 in the chamber. The member 57 insures the rod 55 being maintained in axial alignment with the adjacent contact 51 when the removable column 29 and shaft 43 are connected to the lower column 22 and shaft 26. The upper end of the shaft 43 is suitably connected to the auxiliary steering wheel 58 (Fig. 1) and the central plate 59 of this wheel may constitute a switch contact for closing the circuit through the rods 55 and 50 to actuate the signal device or horn.

The parts of the auxiliary steering column are shown assembled so that the auxiliary steering wheel 58 can be used to control the steering of the vehicle by the occupant of the front seat of the car adjacent the driver. When, for any reason, it is desired or necessary to disconnect the upper parts of the steering column from its lower parts, it will be seen that this may be readily accomplished by turning the handle 41 to release the clamping engagement of the member 32 with the adjacent upper end portion of the lower column 22, so that upward axial movement of the column 29 will cause the slot or groove 46 to be moved out of engagement with the fixed rib or lug 47 on the sleeve 48 and the contact head 56 to be simultaneously moved away from the fixed contact 51 so that the upper portion of the steering column may be withdrawn or removed. The upper end of the shaft 43 adjacent the steering wheel 58 (Fig. 2) is preferably formed with a fixed annular collar 60 arranged to coact with an annular member 61 secured to the inner wall of the upper column 29 by the set screws 62 to insure the simultaneous withdrawal of the shaft 43 with the column 29 when these parts are removed, and which also prevents independent upward axial movement or removal of the shaft 43 relative to the column 29 when the parts are set up. The member 61 also constitutes a guide and support for the upper end portion of the shaft 43. It will be noted that the slit portion 31 of the upper column or section 29 is connected to the clamping member 32 so as to be contracted or expanded therewith, when the upper column is being applied to the lower column or is being removed therefrom.

A closure member or cap 63 (Fig. 6) is arranged to fit over the exposed upper end of the lower column 22 when the upper column is removed so as to close the same and prevent the entrance of foreign matter and dirt into the column. When the upper parts of the auxiliary steering column are removed from the vehicle, means in the form of a cover 64 is preferably provided for shielding or protecting the auxiliary clutch, brake, and accelerator pedals from being accidentally actuated by the feet of the occupant of the front seat of the car adjacent the driver. The cover 64 is of such size and shape as to completely enclose or house the auxiliary pedals 19, 20, and 21, and has extending rearwardly therefrom a spring clip 65 arranged to be detachably connected to the steering column or post 22 (Fig. 6) for detachably securing the cover in position when the upper portion of the steering column is removed. Manifestly, any suitable retaining means may be associated with the cover for firmly maintaining the same in a fixed position to protect the auxiliary pedals and constitute a footrest for the occupant of the front seat of the vehicle adjacent the driver.

Thus, it will be seen that simple, efficient and economical means are provided for detachably connecting the upper portion 29 of the steering column 18 and its associated parts to the lower column 22 so that when the auxiliary steering column is connected to the vehicle, a dual steering mechanism is provided. On the other hand, when the instructor feels that the novice or beginner is capable of driving the car without assistance, the upper portion 29 and its associated parts may be detached or removed from the vehicle and positioned in any convenient out of the way place, such as under the dash or in the rear compartment of the vehicle. Moreover, the dual control mechanism is equally efficient when used with standard types of motor vehicles, such as trucks for delivering mail, newspapers, milk and the like or for collecting articles in cases where deliveries or collections are to be made on the right side of a road or highway. Upon the completion of such deliveries or collections, the upper portion of the auxiliary steering mechanism may be readily detached so as to provide ample space in the front of the vehicle adjacent the operator either to be used for a passenger or other suitable purpose. Additionally, a cover or shield is provided when the vehicle is converted to normal use and the upper steering mechanism is withdrawn from the auxiliary steering column, for providing safety means that prevents the accidental operation of the auxiliary clutch, brake and accelerator pedals and which also forms a footrest for the occupant of the front seat of the car adjacent the driver.

The form of the invention shown is merely illustrative of a preferred embodiment and it is to be understood that such changes may be made as come within the scope of the following claims.

We claim:
1. A steering wheel assembly for motor vehicles including a fixed tubular lower column, a detachable upper column in axial alignment with the lower column, said upper column having its lower ends slit to form a yieldable portion, a clamping member connected to said yieldable portion and arranged to overlap and engage the adjacent end of the lower column when the parts are assembled, manually operable means connected to said clamping member for tightening the same on the lower column, a lower steering shaft rotatably mounted in the lower column and arranged to be operatively connected to the front wheels of the vehicle, an upper steering shaft rotatable in the upper colmun, a steering wheel connected to the upper end of said upper shaft, said upper shaft extending downwardly below the adjacent end of the upper column into the lower column, said lower shaft having a sleeve secured thereto and extending outwardly therefrom to overlap and engage the extending end portion of said upper steering shaft, means on said sleeve coacting with complementary means on the extended portion of said upper shaft for detachably connecting the shafts together, the upper end of said upper steering shaft adjacent the steering wheel having a projection extending outwardly therefrom, and said upper column having an inwardly extending projection positioned above and arranged to overlap and engage the projection on said shaft so that upon axial movement of the upper steering shaft to move the upper tubular column therewith.

2. A steering wheel assembly for motor vehicles including a fixed tubular lower column, a detachable upper column in axial alignment with the lower column, said upper column having its lower ends slit to form a yieldable portion, a clamping member having spaced opposed lugs provided with transversely aligned openings, a threaded bolt extending through said transverse openings, means engaging said bolt for causing the same to contract the clamping member when the parts are assembled, a lower steering shaft rotatably mounted in the lower column and arranged to be operatively connected to the front wheels of the vehicle, an upper steering shaft rotatable in the upper column, a steering wheel connected to the upper end of said upper shaft, said upper shaft extending downwardly below the adjacent end of the upper column into the lower column, said lower shaft having a sleeve secured thereto and extending outwardly therefrom to overlap and engage the extending end portion of said upper steering shaft, said sleeve having a fixed rib extending inwardly thereof, said extending portion of the upper shaft having a longitudinal groove into which said rib extends to lock the shafts together when the parts are assembled, the upper end of said upper steering shaft adjacent the steering wheel having a circumferentially disposed collar extending outwardly therefrom, and said upper column having a projection on its inner wall arranged to overlap and engage said collar so that upon outward axial movement of the upper steering shaft to move the upper tubular column therewith.

ROBERT B. SPRINKEL.
HAVEN D. UMSTOTT.
HAROLD E. KNIGHT, Jr.

REFERENCES CITED

The following references are of record in the file of this patent:

UNITED STATES PATENTS

| Number | Name | Date |
| --- | --- | --- |
| 1,710,399 | Banning | Apr. 23, 1929 |
| 2,018,023 | Kliesrath | Oct. 22, 1935 |
| 2,040,923 | Doane | May 10, 1936 |
| 2,075,110 | Garretson | Mar. 30, 1937 |
| 2,214,163 | DeFrees | Sept. 10, 1940 |
| 2,226,656 | Best | Dec. 31, 1940 |
| 2,320,641 | Murray | June 1, 1943 |
| 2,331,996 | Maurer | Oct. 19, 1943 |
| 2,406,261 | Sprinkel | Aug. 20, 1946 |
| 2,511,165 | Lyman | June 13, 1950 |

FOREIGN PATENTS

| Number | Country | Date |
| --- | --- | --- |
| 456,389 | Germany | Feb. 22, 1928 |